(12) United States Patent
Grosman et al.

(10) Patent No.: US 11,604,597 B2
(45) Date of Patent: Mar. 14, 2023

(54) DATA PROCESSING METHOD AND APPARATUS

(71) Applicant: Huawei Technologies Co., Ltd., Guangdong (CN)

(72) Inventors: Robin Grosman, Toronto (CA); Xun Xue, Toronto (CA); Yuk Kuen Chan, Toronto (CA); Wenbin Ma, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 441 days.

(21) Appl. No.: 16/929,781

(22) Filed: Jul. 15, 2020

(65) Prior Publication Data

US 2020/0348851 A1 Nov. 5, 2020

Related U.S. Application Data

(63) Continuation of application No. PCT/CN2019/071963, filed on Jan. 16, 2019.

(30) Foreign Application Priority Data

Jan. 16, 2018 (CN) .......................... 201810041076.7

(51) Int. Cl.
*G06F 16/23* (2019.01)
*G06F 3/06* (2006.01)
(Continued)

(52) U.S. Cl.
CPC ............ *G06F 3/065* (2013.01); *G06F 3/0607* (2013.01); *G06F 3/0683* (2013.01); *G06F 9/467* (2013.01);
(Continued)

(58) Field of Classification Search
CPC . G06F 3/065; G06F 16/2329; G06F 16/24573
See application file for complete search history.

(56) References Cited

U.S. PATENT DOCUMENTS 8,694,733 B2 4/2014 Krishnan et al.
9,037,821 B1 5/2015 Shah et al.
(Continued)

FOREIGN PATENT DOCUMENTS

CN 1784677 A 6/2006
CN 103297268 A 9/2013
(Continued)

*Primary Examiner* — Loc Tran
(74) *Attorney, Agent, or Firm* — Womble Bond Dickinson (US) LLP

(57) ABSTRACT

This application provides a data processing method and apparatus. The method includes: receiving, by a master storage node, information that is about a first transaction and that is sent by a read-write node, where the information about the first transaction is used to request to perform a write operation on first data stored on the master storage node; determining, by the master storage node, the first data based on the information about the first transaction, and executing the first transaction; generating, by the master storage node, first transaction status metadata when the first transaction ends, where the first transaction status metadata includes identification information of expired data and identification information of the first transaction; and sending, by the master storage node, the first transaction status metadata to at least one read-only node. According to the data processing method and apparatus, a read delay of a read-only node can be eliminated.

10 Claims, 7 Drawing Sheets

(51) Int. Cl.
*G06F 16/2457* (2019.01)
*G06F 9/46* (2006.01)
*G06F 16/27* (2019.01)

(52) U.S. Cl.
CPC .... *G06F 16/2329* (2019.01); *G06F 16/24573* (2019.01); *G06F 16/27* (2019.01)

(56) References Cited

U.S. PATENT DOCUMENTS

| | | |
|---|---|---|
| 9,244,958 B1 | 1/2016 | Maccanti et al. |
| 9,842,031 B1 * | 12/2017 | Kharatishvili .......... G06F 16/27 |
| 2018/0288153 A1 * | 10/2018 | Larsen ................ G06F 11/3034 |

FOREIGN PATENT DOCUMENTS

| | | |
|---|---|---|
| CN | 104537037 A | 4/2015 |
| CN | 104951306 A | 9/2015 |
| CN | 105069160 A | 11/2015 |
| CN | 105324770 A | 2/2016 |
| CN | 103858122 B | 12/2016 |
| CN | 106909467 A | 6/2017 |
| CN | 107077495 A | 8/2017 |

\* cited by examiner

DATA PROCESSING METHOD AND APPARATUS

CROSS-REFERENCE TO RELATED APPLICATIONS

This application is a continuation of International Application No. PCT/CN2019/071963, filed on Jan. 16, 2019, which claims priority to Chinese Patent Application No. 201810041076.7, filed on Jan. 16, 2018, the disclosures of which are incorporated herein by reference in their entireties.

TECHNICAL FIELD

This application relates to the communications field, and in particular, to a data processing method and apparatus in the communications field.

BACKGROUND

In a core service system having a high data read/write pressure, a single read-write node of a database has a high service pressure, and a data read/write operation has a slow response. The core service system generally uses a distributed database having a read-write isolation architecture, to extend a read-only capability of a database system. In the database having the read-write isolation architecture, a read-only operation on data is offloaded to a read-only node of the database, to reduce a service pressure of the read-write node of the database. In one embodiment, a master node is used as a read-write node, and a write operation performed on data on a storage node, that is, information about modified data, may be synchronized to a slave node by using a log. The slave node is used as a read-only node, implements a data update by redoing the log, and provides a read-only service of data.

However, a read delay may occur when data synchronization is implemented between the read-write node and the read-only node through log replication. A reason is as follows: data that the read-write node requests to update needs to undergo a delay of a second level to a minute level before being sensed by the read-only node. For example, after updating the data according to the request of the read-write node, the storage node periodically sends information about modified data to the read-only node for backup, so that the read-only node obtains data of a latest version based on the foregoing information. The period may be a fixed time period such as 30 s or 1 min. Consequently, data read by a client by using the read-only node is early data that is read seconds to minutes ago. Because of the read delay of the read-only node, for a service highly sensitive to a data delay, a read-only operation on data cannot be implemented by using the read-only node.

SUMMARY

This application provides a data processing method and apparatus, so as to eliminate read delay of a read-only node.

According to a first aspect, a data processing method is provided. The method includes: receiving, by a master storage node, information that is about a first transaction and that is sent by a read-write node, where the information about the first transaction is used to request to perform a write operation on first data stored on the master storage node; determining, by the master storage node, the first data based on the information about the first transaction, and executing the first transaction; generating, by the master storage node, first transaction status metadata based on a current status of the first data when the first transaction ends, where the first transaction status metadata includes identification information of expired data and identification information of the first transaction; and sending, by the master storage node, the first transaction status metadata to at least one read-only node.

It should be understood that, that a transaction ends means that the transaction is committed, interrupted, or rolled back. That the transaction is committed means that the transaction is successfully executed. That the transaction is rolled back means that the transaction is restored to a status of the transaction before the transaction is executed. That the transaction is interrupted means that execution of the transaction is stopped. When performing parsing, the master storage node determines whether the first transaction ends. When the first transaction ends, the master storage node may generate the first transaction status metadata that includes the identification information of the expired data and the identification information of the first transaction. The identification information of the expired data and the identification information of the first transaction may be an identifier ID of an expired page and an identifier ID of the first transaction. However, this is not limited in this embodiment of this application.

In one embodiment, the first transaction status metadata may include information such as a list of data pages that should expire in a buffer, a list of committed transactions, and an LSN visible under a currently executed transaction after modification is made through a redo log operation.

In this embodiment, once the first transaction status metadata is generated, the master storage node sends the first transaction status metadata to the at least one read-only node, so that the at least one read-only node updates local transaction status metadata based on the first transaction status metadata.

In one embodiment, the master storage node actively pushes transaction status metadata to the read-only node when a transaction ends, so that the read-only node can obtain a latest transaction status, to ensure that content of a data page on the read-write node is consistent with content of a data page obtained through a read-only operation of the read-only node, and cancel a read delay of the read-only node, thereby improving user experience.

With reference to the first aspect, in some embodiments, after the generating, by the master storage node, first transaction status metadata based on a current status of the first data, the method further includes: sending, by the master storage node, a response message to the read-write node, where the response message is used to indicate a result of executing the first transaction.

In one embodiment, the master storage node may further send the response message to the read-write node, to respond to network communication, and notify the read-write node of the result of executing the first transaction. It should be understood that a result of executing a transaction may include that the transaction is committed, interrupted, or rolled back. This is not limited in this embodiment of this application. In one embodiment, the read-write node receives the response message, and may delete a corresponding redo log from a log record after learning that the first transaction is committed.

With reference to the first aspect, in some embodiments, the information about the first transaction includes at least one log, a first log in the at least one log carries a first identifier, the first identifier is used to identify that the first transaction ends, and a log sequence number of the first log is a largest value in a log sequence number of the at least one log.

It should be understood that the first transaction includes at least one log, each log includes a log sequence number, the master storage node sequentially executes the log of the first transaction based on the log sequence number, and the end identifier is carried to enable the master storage node to quickly identify that a transaction ends. For example, the first transaction may include three logs, and the three logs are respectively a log of an a=1 type, a log of a b=1 type, and a log of an end type according to an execution sequence; the master storage node sequentially executes the logs of the a=1 type, the b=1 type, and the end type, and when the log of the end type is found, the master storage node learns that the first transaction ends, and does not need to continue to process the first transaction.

Because the master storage node performs processing according to an LSN sequence, a log indicating that a transaction ends definitely has a largest LSN. When the log indicating that the transaction ends is executed, other logs definitely have been committed.

In this embodiment, the master storage node may quickly identify ending of the transaction by using the first identifier, to trigger generation of transaction status metadata, and further cancel the read delay of the read-only node, thereby improving system performance. It should be understood that when the master storage node constructs a data page of a version based on the redo log, if the redo log carrying the first identifier (for example, the end type) is found, the redo log may be directly ignored, that is, data is not processed. A reason is as follows: The redo log carrying the first identifier is merely used to indicate that a transaction ends, and does not have an additional meaning; in other words, the redo log of this type does not request to modify data.

With reference to the first aspect, in some embodiments, the determining, by the master storage node, the first data based on the information about the first transaction, and executing the first transaction includes: parsing, by the master storage node, the at least one log; and replicating, by the master storage node, the at least one log to at least one slave storage node according to a replication protocol.

In one embodiment, the master storage node may parse the at least one log included in the first transaction, and when there are slave storage nodes, the master storage node may store the at least one log (for example, the redo log) into log repositories of most slave storage nodes according to the replication protocol (for example, a quorum replication protocol).

With reference to the first aspect, in some embodiments, the replicating, by the master storage node, the at least one log to at least one slave storage node according to a replication protocol includes: replicating, by the master storage node, the at least one log to the at least one slave storage node according to the replication protocol when the master storage node parses the at least one log.

In one embodiment, the master storage node may concurrently parse and replicate the at least one log. In other words, the master storage node replicates the at least one log to the at least one slave storage node according to the replication protocol when parsing the at least one log.

In this embodiment, the at least one log is replicated between different storage nodes and the master storage node parses the at least one log at the same time, thereby increasing a speed of generating the first transaction status metadata, preventing a slow update of transaction status information from affecting a speed of committing the first transaction, and increasing a request throughput rate of the read-write node.

With reference to the first aspect, in some embodiments, after the generating, by the master storage node, first transaction status metadata based on a current status of the first data, the method further includes: sending, by the master storage node, the first transaction status metadata to the read-write node.

In one embodiment, after generating the first transaction status metadata, the master storage node may further send the first transaction status metadata to the read-write node. That is, the read-write node may further include a global transaction status metadata module, configured to store transaction status metadata. The transaction status metadata may be generated by the read-write node, or may be sent by the master storage node to the read-write node. This is not limited in this embodiment of this application.

It should be understood that an advantage of disposing, on the read-write node, the module storing the global transaction status metadata is as follows: The read-write node is generally specified by an external manager or administrator, and each read-only node has clear management configuration information about a node from which transaction status metadata information on the read-write node can be obtained. However, because data is backed up between storage nodes according to a consistency replication protocol, roles of the master storage node and the slave storage node may change during running, that is, a master storage node becomes a slave storage node, and a slave storage node becomes a master storage node. If the module storing the global transaction status metadata is located on the master storage node, the read-only node needs an extra mechanism to identify which storage node is a master storage node, to obtain transaction status metadata information. Therefore, the method in this embodiment of this application facilitates management, and system flexibility can be improved.

According to another aspect, another data processing method is provided. The method includes: receiving, by a master storage node, a first request message sent by a read-only node, where the first request message is used to request to update local transaction status metadata, and the local transaction status metadata includes identification information of expired data and identification information of a committed transaction; and sending, by the master storage node, a first transaction status metadata to the read-only node, where the first transaction status metadata includes identification information of expired data and identification information of a first transaction, and the first transaction is a committed transaction.

According to a second aspect, another data processing method is provided. The method includes: sending, by a read-write node, information about a first transaction to a master storage node, where the information about the first transaction is used to request to perform a write operation on first data stored on the master storage node; receiving, by the read-write node, a response message sent by the master storage node, where the response message is used to indicate a result of executing the first transaction; and sending, by the read-write node, first transaction status metadata to at least one read-only node when the read-write node receives the response message, where the first transaction status metadata includes identification information of expired data and identification information of the first transaction.

In one embodiment, the read-write node actively pushes transaction status metadata to the read-only node when receiving a response of a result of executing a transaction, so that the read-only node can obtain a latest transaction status, to ensure that content of a data page on the read-write node is consistent with content of a data page obtained through a read-only operation of the read-only node, and cancel a read delay of the read-only node, thereby improving user experience.

With reference to a second aspect, in some embodiments, before the sending, by the read-write node, first transaction status metadata to at least one read-only node, the method further includes: receiving, by the read-write node, the first transaction status metadata sent by the master storage node, or generating, by the read-write node, the first transaction status metadata when the first transaction ends.

With reference to the second aspect, in some embodiments, the information about the first transaction includes at least one log, a first log in the at least one log carries a first identifier, the first identifier is used to identify that the first transaction ends, and a log sequence number of the first log is a largest value in a log sequence number of the at least one log.

According to another aspect of this application, another data processing method is provided. The method includes: receiving, by a read-write node, a first request message sent by a read-only node, where the first request message is used to request to update local transaction status metadata, and the local transaction status metadata includes identification information of expired data and identification information of a committed transaction; and sending, by the read-write node, a first transaction status metadata to the read-only node, where the first transaction status metadata includes identification information of expired data and identification information of a first transaction, and the first transaction is a committed transaction.

According to a third aspect, another data processing method is provided. The method includes: receiving, by a read-only node, a second request message sent by a first client, where the second request message is used to request to perform a read-only operation on second data stored on at least one storage node, and the at least one storage node includes a master storage node; sending, by the read-only node, a first request message to the master storage node or a read-write node based on the second request message, where the first request message is used to request to update local transaction status metadata, and the local transaction status metadata includes identification information of expired data and identification information of a committed transaction; receiving, by the read-only node, first transaction status metadata that is sent by the master storage node or the read-write node based on the first request message, and updating the local transaction status metadata; and reading, by the read-only node, the second data from the at least one storage node based on updated local transaction status metadata.

In one embodiment, before performing a read-only operation, the read-only node sends an update request to the master storage node or the read-write node that stores transaction status metadata, and the master storage node or the read-write node sends latest transaction status metadata to the read-only node only after receiving the update request, so that the read-only node can obtain a latest transaction status before performing the read-only operation, to ensure that content of a data page on the read-write node is consistent with content of a data page obtained through a read-only operation of the read-only node, and cancel a read delay of the read-only node, thereby improving user experience.

With reference to the third aspect, in some embodiments, the reading, by the read-only node, the second data from the at least one storage node based on updated local transaction status metadata includes: determining, by the read-only node, a second identifier based on the updated local transaction status metadata, where the second identifier corresponds to a latest version of the second data; sending, by the read-only node, a third request message to the at least one storage node, where the third request message is used to request to read the second data corresponding to the second identifier; and receiving, by the read-only node, the second data that corresponds to the second identifier and that is sent by the at least one storage node.

With reference to the third aspect, in some embodiments, before the sending, by the read-only node, a first request message to the master storage node or a read-write node based on the second request message, the method further includes: buffering, by the read-only node, the second request message, and starting a timer; and receiving, by the read-only node, at least one fourth request message sent by a second client, where the at least one fourth request message is used to request to perform a read-only operation on third data stored on the at least one storage node; and the sending, by the read-only node, a first request message to the master storage node or a read-write node based on the second request message includes: sending, by the read-only node, the first request message to the master storage node or the read-write node when a quantity of messages buffered on the read-only node exceeds a first threshold, or the timer expires.

In one embodiment, the read-only node may block a request of initiating updating of transaction status metadata, and initiate requests in batches after a received request message meets a specific condition. After receiving the second request message sent by the first client, the read-only node may buffer the second request message and start the timer. Subsequently, the read-only node may receive another request message that is sent by another client and that is used to request to perform a read-only operation on other data, for example, the at least one fourth request message that is sent by the second client and that is used to request to perform the read-only operation on the third data. The read-only node may determine, in real time, whether a quantity of messages in a buffer queue exceeds the first threshold, or whether the timer expires. If the quantity of messages in the buffer queue exceeds the first threshold, or the timer expires, the read-only node sends the first request message to the master storage node or the read-write node, to request to update the local transaction status metadata.

In this embodiment, the read-only node blocks a single read-only transaction within a specific time, and obtains transaction status metadata from the storage node in batches for a plurality of read-only transactions, thereby preventing transaction status metadata on the storage node from being separately obtained for each read-only transaction, avoiding a high network load caused because transaction status metadata is obtained once for each read-only transaction, and increasing a throughput rate of obtaining transaction status metadata.

According to a fourth aspect, a data processing apparatus. The apparatus is configured to perform the method in any one of the first aspect or the embodiments of the first aspect. In one embodiment, the data processing apparatus includes units configured to perform the method in any one of the first aspect or the possible implementations of the first aspect.

According to a fifth aspect, another data processing apparatus is provided. The apparatus is configured to perform the method in any one of the second aspect or the embodiments of the second aspect. In one embodiment, the data processing apparatus includes units configured to perform the method in any one of the second aspect or the embodiments of the second aspect.

According to a sixth aspect, another data processing apparatus is provided. The apparatus is configured to perform the method in any one of the third aspect or the embodiments of the third aspect. In one embodiment, the data processing apparatus includes units configured to perform the method in any one of the third aspect or the embodiments of the third aspect.

According to a seventh aspect, another data processing apparatus is provided. The apparatus includes at least one processor, a memory, and a communications interface. The at least one processor, the memory, and the communications interface are connected through an internal path. The memory is configured to store a computer executable instruction, and the at least one processor is configured to execute the computer executable instruction stored in the memory, so that the apparatus can exchange data with another apparatus through the communications interface, to perform the method in any one of the first aspect or the embodiments of the first aspect.

According to an eighth aspect, another data processing apparatus is provided. The apparatus includes at least one processor, a memory, and a communications interface. The at least one processor, the memory, and the communications interface are connected through an internal path. The memory is configured to store a computer executable instruction, and the at least one processor is configured to execute the computer executable instruction stored in the memory, so that the apparatus can exchange data with another apparatus through the communications interface, to perform the method in any one of the second aspect or the embodiments of the second aspect.

According to a ninth aspect, another data processing apparatus is provided. The apparatus includes at least one processor, a memory, and a communications interface. The at least one processor, the memory, and the communications interface are connected through an internal path. The memory is configured to store a computer executable instruction, and the at least one processor is configured to execute the computer executable instruction stored in the memory, so that the apparatus can exchange data with another apparatus through the communications interface, to perform the method in any one of the third aspect or the embodiments of the third aspect.

According to a tenth aspect, a data processing system is provided. The system includes the apparatus in any one of the fourth aspect or the embodiments of the fourth aspect, the apparatus in any one of the fifth aspect or the embodiments of the fifth aspect, and the apparatus in any one of the sixth aspect or the embodiments of the sixth aspect; or the system includes the apparatus in any one of the seventh aspect or the possible implementations of the seventh aspect, the apparatus in any one of the eighth aspect or the embodiments of the eighth aspect, and the apparatus in any one of the ninth aspect or the embodiments of the ninth aspect.

According to an eleventh aspect, a computer program product is provided. The computer program product includes computer program code. When the computer program code is executed by a computer, the computer performs the method in any one of the first aspect or the embodiments of the first aspect.

According to a twelfth aspect, a computer program product is provided. The computer program product includes computer program code. When the computer program code is executed by a computer, the computer performs the method in any one of the second aspect or the embodiments of the second aspect.

According to a thirteenth aspect, a computer program product is provided. The computer program product includes computer program code. When the computer program code is executed by a computer, the computer performs the method in any one of the third aspect or the embodiments of the third aspect.

According to a fourteenth aspect, a computer readable medium is provided, configured to store a computer program. The computer program includes an instruction used to perform the method in any one of the first aspect or the embodiments of the first aspect.

According to a fifteenth aspect, a computer readable medium is provided, configured to store a computer program. The computer program includes an instruction used to perform the method in any one of the second aspect or the embodiments of the second aspect.

According to a sixteenth aspect, a computer readable medium is provided, configured to store a computer program. The computer program includes an instruction used to perform the method in any one of the third aspect or the embodiments of the third aspect.

According to a seventeenth aspect, a chip system is provided, including: an input interface, an output interface, at least one processor, and a memory. The input interface, the output interface, the processor, and the memory communicate with each other through an internal connection path. The processor is configured to execute code in the memory. When the code is executed, the processor is configured to perform the method in any one of the first aspect or the embodiments of the first aspect.

According to an eighteenth aspect, a chip system is provided, including: an input interface, an output interface, at least one processor, and a memory. The input interface, the output interface, the processor, and the memory communicate with each other through an internal connection path. The processor is configured to execute code in the memory. When the code is executed, the processor is configured to perform the method in any one of the second aspect or the embodiments of the second aspect.

According to a nineteenth aspect, a chip system is provided, including: an input interface, an output interface, at least one processor, and a memory. The input interface, the output interface, the processor, and the memory communicate with each other through an internal connection path. The processor is configured to execute code in the memory. When the code is executed, the processor is configured to perform the method in any one of the third aspect or the embodiments of the third aspect.

DESCRIPTION OF EMBODIMENTS

Figure 1:
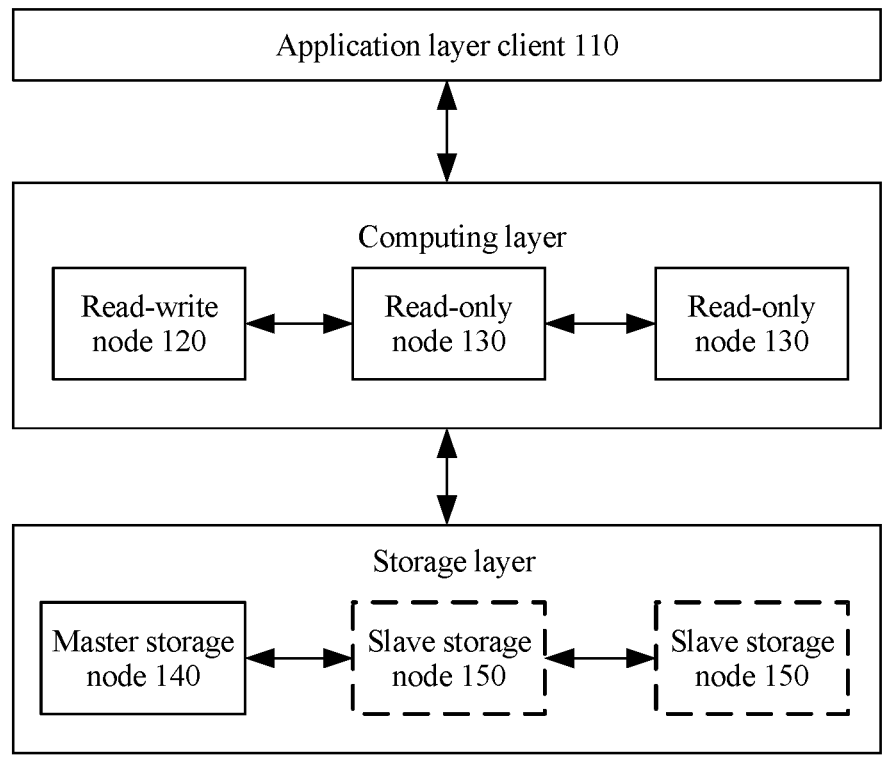
FIG. 1 is a schematic diagram of a database system according to an embodiment.

The following describes the technical solutions in this application with reference to the accompanying drawings.

For ease of understanding, related terms in the embodiments of this application are described first.

A node is a network entity configured to perform a particular operation in a database system, and may be a physical machine or a virtual machine. Different nodes may have different names based on functions provided by the nodes.

A database transaction is also referred to as a transaction, is a logical unit in a process of running a database management system, and includes a limited database operation sequence.

That a transaction ends means that a transaction is committed, interrupted, or rolled back. That the transaction is committed means that the transaction is successfully executed. That the transaction is rolled back means that the transaction is restored to a status of the transaction before the transaction is executed. That the transaction is interrupted means that execution of the transaction is stopped (the transaction may be rolled back or may not be rolled back).

Read-write isolation means that in a distributed database system, one or more database nodes provide an external read/write operation service of addition, deletion, modification, and querying services (including: querying, adding, deleting, and updating data or a database model), and another one or more database nodes provide an external read-only operation service of a querying service.

A database read-write node (briefly referred to as a "read-write node") is a read/write operation service node that provides external addition, deletion, modification, and querying services.

A database read-only node (briefly referred to as a "read-only node") is a node that provides an external read-only operation service of a querying service.

A database storage node (briefly referred to as a "storage node") is a node that provides an external data storage function. The database storage node may be classified into two categories: a master storage node and a slave storage node.

It should be understood that generally, the storage node stores data; the read-write node may send a read request to the storage node to request to read data stored on the storage node, or may send a write request to the storage node to request to write new data into the storage node, or modify data stored on the storage node; the read-only node may send a read-only request to the storage node to request to read data stored on the storage node, and the read-only node cannot modify the data or write new data.

A read delay means that on a database read-only node in a distributed database system, data read by a client lags behind latest data updated on a database read-write node by a specific time. After data is updated on the database read-write node, data on the read-only node is inconsistent with data on the read-write node.

A buffer pool is a memory area used to temporarily store one or more data pages in a computer.

A data page (briefly referred to as a "page") is a data structure used to organize data content in a memory of a database system, and one page includes a plurality of rows of data.

A redo log includes a group of change vectors, and each change vector records modification on one data block in a database. An execution sequence of each redo log is marked by a log sequence number (LSN).

A quorum replication protocol is a data replication protocol, and is used to replicate data and a log to a plurality of storage nodes, so that the data and the log are stored on at least most storage nodes. "Most" means more than a half of a total quantity of storage cluster nodes.

Identification information of expired data is information used to identify the expired data, for example, an identification (ID) of an expired data page. It should be understood that being expired means that a write operation has been performed on data on a storage node. For example, before a transaction is executed, a=1, and an identification of a corresponding data page is 001; and after the transaction is executed, a=1 is modified into a=2, and an identification of a corresponding data page is 002. In this case, a=1 becomes expired data, and the identification 001 is an identification of the expired data.

Identification information of a transaction is used to identify a specific transaction, for example, an ID of a transaction. It should be understood that a storage node may receive a plurality of different transactions from a read-write node, and the plurality of transactions have their respective identifiers, so that the storage node distinguishes between the transactions. If a transaction is committed, the storage node records and stores identification information of the transaction.

After executing a transaction according to a request of a read-write node, a storage node sends information about modified data in an execution process to a read-only node for backup, where the information is identification information of expired data and identification information of a committed transaction (collectively referred to as transaction status metadata in this application), so that the read-only node determines, based on the identification information of the expired data, which data page has expired, determines a committed and a latest log sequence number LSN of a log used to record a committed transaction based on the identification information of the committed transaction, and redo a log based on the LSN, to obtain data of a latest version.

FIG. 1 is a schematic diagram of a database system according to an embodiment. As shown in FIG. 1, database system 100 includes an application layer, a computing layer, and a storage layer. In one embodiment, the application layer includes an application layer client 110, the computing layer includes a read-write node 120 and at least one read-only node 130, and the storage layer includes a master storage node 140. In one embodiment, the storage layer may further include at least one slave storage node 150. In one embodiment, the database system 100 may further include a proxy layer, and the proxy layer may further include at least one proxy node. The following describes in detail the nodes of the database system 100.

1. The application layer client 110 is a computer node used by a user to initiate an operation request (for example, a structured query language (SQL) request, where the SQL is a standard data query language used in a database), and send the operation request to the proxy node.

2. The proxy node is configured to: distribute a request, distribute a read/write request of a client to the read-write node, and distribute a read-only request to the read-write node or the read-only node.

3. The computing layer is responsible for actually executing a request, and a data page required for executing the request is obtained from a local buffer of a node or from the lower storage layer. The computing layer includes the read-write node and the read-only node, which are collectively referred to as nodes. Each node includes a data module responsible for page data and a transaction module responsible for transaction information.

(1) Read-Write Node 120

Figure 2:
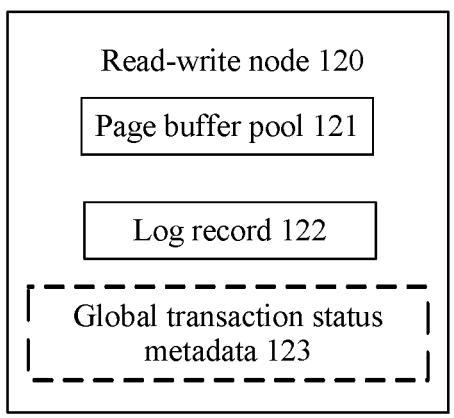
FIG. 2 is a schematic diagram of software modules of a read-write node according to an embodiment.

The read-write node 120 is a database computer node configured to execute query and modification (including adding, deleting, or updating data or a database model) statements. In a possible implementation, as shown in FIG. 2, the read-write node 120 may include the following software modules:

A page buffer pool 121 is configured to temporarily store a data page in a memory for quick access.

A log record 122 is a memory area used to temporarily store a redo log on which the storage node has not completed commit persistency.

In one embodiment, the read-write node 120 may further include global transaction status metadata module 123, and the global transaction status metadata module 123 is a memory area used to record transaction-related metadata such as expired page information of a transaction, a list of committed transactions, an LSN, and a version of a data page buffered on each read-only node.

(2) Read-Only Node 130

Figure 3:
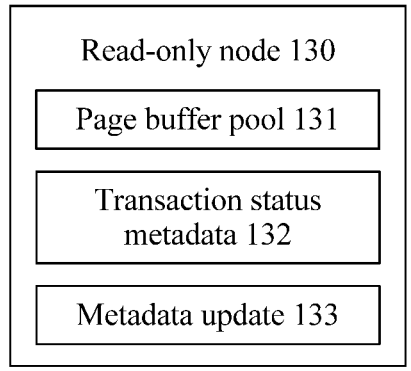
FIG. 3 is a schematic diagram of software modules of a read-only node according to an embodiment.

The read-only node 130 is a database computer node configured to execute a read-only query statement. In one embodiment, as shown in FIG. 3, the read-only node 130 may include the following software modules:

A page buffer pool 131 is configured to temporarily store a data page in a memory for quick access.

Transaction status metadata module 132 is a memory area used to record transaction-related metadata such as expired page information of a transaction, a list of committed transactions, and an LSN.

A metadata update module 133 is a logical module responsible for exchanging global transaction status metadata with the storage node, and updates transaction status metadata on the read-only node.

4. The storage layer is responsible for storing data content and transaction status information of a database.

(1) Master Storage Node 140

Figure 4:
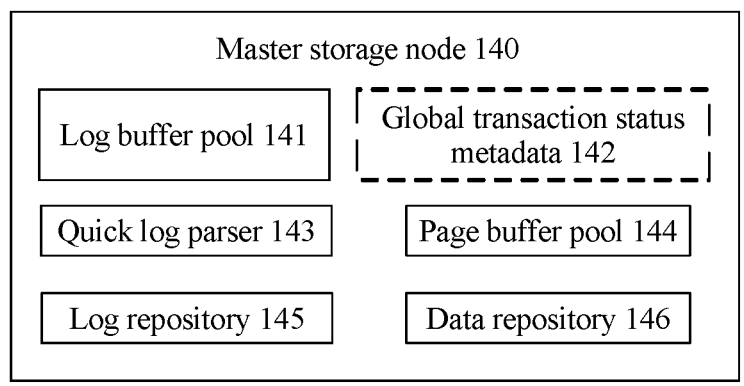
FIG. 4 is a schematic diagram of software modules of a master storage node according to an embodiment.

The master storage node 140 is a computer node configured to parse a memory, buffer a redo log, buffer a data page, maintain transaction status metadata, and store a redo log and a data page in a magnetic disk. In a possible implementation, as shown in FIG. 4, the master storage node 140 may include the following software modules:

A log buffer pool 141 is a memory area used to temporarily store, in the storage node, a log sent by the read-write node, where the log is mainly a redo log.

A quick log parser 143 is responsible for quickly parsing the redo log, establishing a correspondence between the redo log and an operated page, and storing the redo log into the log buffer pool.

A page buffer pool 144 is configured to temporarily store a data page in a memory for quick access.

A log repository 145 is configured to persistently store the redo log in the magnetic disk of the storage node, and a plurality of copies of the redo log are stored in log repositories of different storage nodes according to the quorum replication protocol.

A data repository 146 is configured to persistently store a data page in the magnetic disk of the storage node.

In one embodiment, the master storage node 140 may further include global transaction status metadata 142, and the global transaction status metadata 142 is a memory area used to record transaction-related metadata such as expired page information of a transaction, a list of committed transactions, an LSN, and a version of a data page buffered on each read-only node.

(2) Slave Storage Node 150

The slave storage node 150 and the master storage node 140 form a storage cluster. There may be one or more slave storage nodes 150. The master storage node 140 and the slave storage node 150 may be collectively referred to as storage nodes. The storage nodes may communicate with each other through a network, and a log repository of the master storage node 140 is synchronized with a log repository of the at least one slave storage node 150 according to the quorum replication protocol. Because a function of the slave storage node 150 is similar to that of the master storage node 140, details are not described herein again.

It should be understood that roles of the master storage node and the slave storage node may change during running, that is, a master storage node becomes a slave storage node, and a slave storage node becomes a master storage node. Therefore, a global transaction status metadata module may also be disposed on the slave storage node (all slave storage nodes, or some slave storage nodes that may become master storage nodes), to store global transaction status metadata, so that when the slave storage node becomes a master storage node, the master storage node can quickly provide transaction status metadata for the read-only node. However, this is not limited in this embodiment of this application.

It should be further understood that in the database system 100, layers may communicate with each other through a network, but each layer communicates only with adjacent upper and lower layers, and does not communicate with other layers. Different nodes at each layer may communicate with each other through a network, memory access, or magnetic disk access.

In a core service system having a high data read/write pressure, a single read-write node of a database has a high service pressure, and a data read/write operation has a slow response. The core service system generally uses a distributed database having a read-write isolation architecture, to extend a read-only capability of the database system. In the database having the read-write isolation architecture, a read-only operation on data is offloaded to a read-only node of the database, to reduce a service pressure of the read-write node of the database. In one embodiment, a master node is used as a read-write node, and a write operation performed on data on a storage node, that is, information about modified data, may be synchronized to a slave node by using a log; and the slave node is used as a read-only node, implements a data update by redoing the log, and provides a read-only service of data.

However, a read delay may occur when data synchronization is implemented between the read-write node and the read-only node through log replication. A reason is as follows: data that the read-write node requests to update needs to undergo a delay of a second level to a minute level before being sensed by the read-only node. For example, after updating the data according to the request of the read-write node, the storage node periodically sends information about modified data to the read-only node for backup. The period may be a fixed time period such as 30 s or 1 min. Consequently, data read by a client by using the read-only node is early data that is read seconds to minutes ago. This is unacceptable for a service highly sensitive to a data delay (for example, gift package redemption or red envelop sending). Because of the read delay of the read-only node, for a service highly sensitive to a data delay, a read-only operation on data cannot be implemented by using the read-only node.

Currently, the following technology exists: In a system architecture including hardware modules such as a master SQL node, a slave SQL node, a distributed storage cluster, and a repository for backing up data in the distributed storage cluster for disaster recovery (e.g., Amazon S3), the master SQL node processes a read/write operation of a database, and writes or reads redo log data of the distributed storage cluster, the slave SQL node obtains the redo log data from the master SQL node or the distributed storage cluster, and performs a read-only operation of the database, and the storage cluster stores, according to the quorum replication protocol, the redo log sent by the master SQL node, and responds to a request of the master SQL node and the slave SQL node of reading a data page corresponding to the redo log. Data in the storage cluster is backed up to the repository for backing up data by using a distributed write method and according to a specific policy. In the system architecture, the (master/slave) SQL nodes are separated from the storage layer, the storage node provides uniform data write and data read services, and a redo log is synchronized and an LSN of a persistent redo log is updated between the master SQL node and the slave SQL node, so that a read-only transaction of the slave SQL node constructs a data page based on the redo log stored in the storage cluster.

However, the foregoing technology does not completely resolve a read delay of the SQL read-only node. For example, within a time interval when the slave SQL node receives an LSN that is of a latest persistent redo log and that is sent by the master SQL node, data of a transaction 1 is updated on the SQL read-write node, another read-only transaction 2 on the slave SQL node does not know that the transaction 1 is committed, only a data page of an early version can be constructed based on the LSN of the early persistent redo log, and the data page of the early version is inconsistent with a latest data page on the read-write node. During actual use, the data page constructed on the slave SQL node lags behind the latest data page on the master SQL node by an average of 20 ms, for example.

To sum up, in a core service system, a read-write isolation database that can implement strong data consistency, that is, a zero read delay, and that can implement read-only capability scalability is urgently needed.

Figure 5:
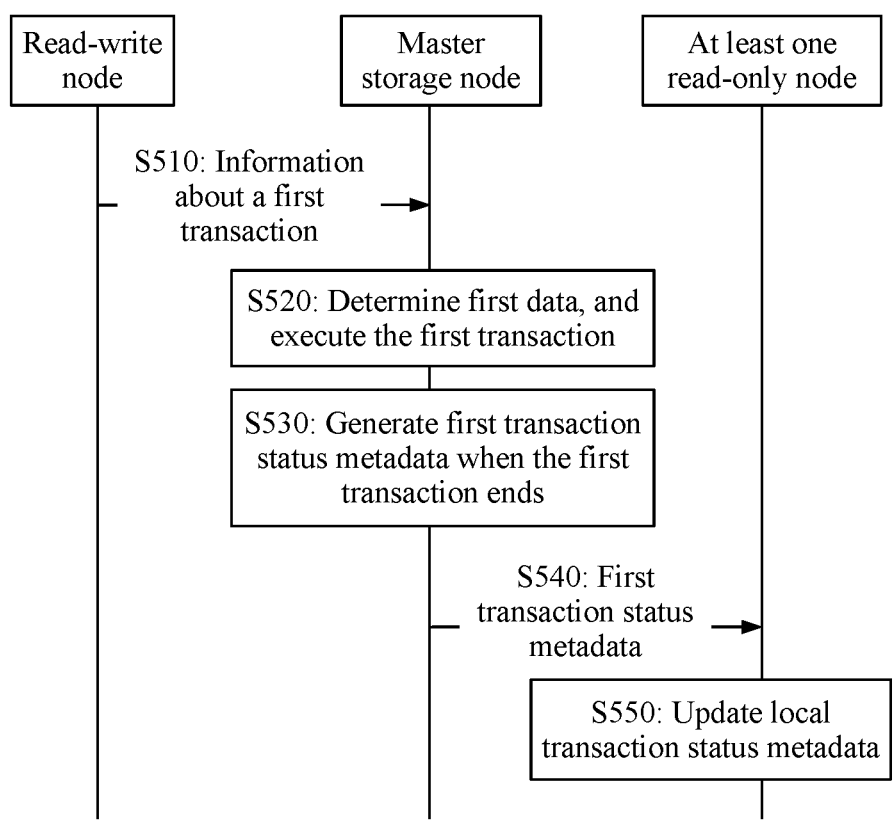
FIG. 5 is a schematic flowchart of a data processing method according to an embodiment.

FIG. 5 is a schematic flowchart of a data processing method according to an embodiment. Referring to FIG. 5, method 500 may be applied to the communications system 100 shown in FIG. 1, but this embodiment of this application is not limited thereto.

S510: A read-write node sends information about a first transaction to a master storage node, where the information about the first transaction is used to request to perform a write operation on first data stored on the master storage node, and the information about the first transaction may include at least one log.

Correspondingly, the master storage node receives the information that is about the first transaction and that is sent by the read-write node.

S520: The master storage node determines the first data based on the information about the first transaction, and executes the first transaction.

S530: The master storage node generates first transaction status metadata when the first transaction ends, where the first transaction status metadata includes identification information of expired data and identification information of the first transaction.

S540: The master storage node sends the first transaction status metadata to at least one read-only node.

Correspondingly, the at least one read-only node receives the first transaction status metadata.

S550: The at least one read-only node updates local transaction status metadata based on the first transaction status metadata.

In one embodiment, the read-write node may send the information about the first transaction to the master storage node, to request to perform the write operation on the first data. The information about the first transaction may include at least one log, and the following uses a redo log as an example for description. Content of the redo log may include a type of an operation, content of the operation, a log sequence number LSN, and the like. In one embodiment, the read-write node may temporarily store the redo log in a log record 122, send, to the master storage node through network communication (for example, RPC), a redo log on which a database needs to perform a read/write operation, and wait for a response from the storage node. After receiving the information about the first transaction, the master storage node may parse the redo log included in the information, and match the redo log with a corresponding data page, that is, determine the first data. In one embodiment, the master storage node may store the redo log into a log buffer pool 141, parse the redo log by using a quick log parser 143, and match the redo log with a corresponding data page.

It should be understood that in this embodiment of this application, the first transaction status metadata includes the identification information of the expired data and the identification information of the first transaction. The master storage node sends the information to the read-only node, so that the read-only node determines, based on the identification information of the expired data, which data page in the buffer has expired, determines, based on the identification information of the first transaction, a latest log sequence number LSN corresponding to an ended (committed, interrupted, or rolled back) transaction, and redo a log based on the LSN, to obtain data of a latest version.

It should be further understood that, that a transaction ends means that the transaction is committed, interrupted, or rolled back. That the transaction is committed means that the transaction is successfully executed. That the transaction is rolled back means that the transaction is restored to a status of the transaction before the transaction is executed. That the transaction is interrupted means that execution of the transaction is stopped. When performing parsing, the master storage node determines whether the first transaction ends. When the first transaction ends, the master storage node may generate the first transaction status metadata that includes the identification information of the expired data and the identification information of the first transaction. The identification information of the expired data and the identification information of the first transaction may be an identifier ID of an expired page and an identifier ID of the first transaction. However, this is not limited in this embodiment of this application.

In one embodiment, the first transaction status metadata may include information such as a list of data pages that should expire in a buffer, a list of committed transactions, and an LSN visible under a currently executed transaction after modification is made through a redo log operation. In one embodiment, if the master storage node includes global transaction status metadata 142, the master storage node may store the first transaction status metadata into the global transaction status metadata 142; or if the master storage node does not include global transaction status metadata 142, the master storage node may send the first transaction status metadata to the read-write node.

In this embodiment, once the first transaction status metadata is generated, the master storage node sends the first transaction status metadata to the at least one read-only node, so that the at least one read-only node updates the local transaction status metadata based on the first transaction status metadata.

According to the data processing method in this embodiment of this application, the master storage node actively pushes transaction status metadata to the read-only node when a transaction ends, so that the read-only node can obtain a latest transaction status, to ensure that content of a data page on the read-write node is consistent with content of a data page obtained through a read-only operation of the read-only node, and cancel a read delay of the read-only node, thereby improving user experience.

In one embodiment, after the generating, by the master storage node, first transaction status metadata based on a current status of the first data, the method further includes:

sending, by the master storage node, a response message to the read-write node, where the response message is used to indicate a result of executing the first transaction.

Correspondingly, the read-write node receives the response message sent by the master storage node.

In one embodiment, the master storage node may further send the response message to the read-write node, to respond to network communication, and notify the read-write node of the result of executing the redo log. It should be understood that a result of executing a transaction may include that the transaction is committed, interrupted, or rolled back. This is not limited in this embodiment of this application. In one embodiment, the read-write node receives the response message, and may delete a corresponding redo log from the log record 122 after learning that the first transaction is committed.

In one embodiment, the information about the first transaction includes at least one log, a first log in the at least one log carries a first identifier, the first identifier is used to identify that the first transaction ends, and a log sequence number of the first log is a largest value in a log sequence number of the at least one log.

In one embodiment, the at least one log includes the first log, the first log carries the first identifier, and the first identifier is also referred to as an end identifier, and is used to identify that the first transaction ends. In one embodiment, a redo log of an end type may be added to identify that a transaction ends. However, this is not limited in this embodiment of this application.

It should be understood that the first transaction includes at least one log, each log includes a log sequence number, the master storage node sequentially executes the log of the first transaction based on the log sequence number, and the end identifier is carried to enable the master storage node to quickly identify that a transaction ends. For example, the first transaction may include three logs, and the three logs are respectively a log of an a=1 type, a log of a b=1 type, and a log of an end type according to an execution sequence; the master storage node sequentially executes the logs of the a=1 type, the b=1 type, and the end type, and when the log of the end type is found, the master storage node learns that the first transaction ends, and does not need to continue to process the first transaction.

Because the master storage node performs processing according to an LSN sequence, a log indicating that a transaction ends definitely has a largest LSN. When the log indicating that the transaction ends is executed, other logs definitely have been committed.

In this embodiment, the master storage node may quickly identify ending of the transaction by using the first identifier, to trigger generation of transaction status metadata, and further cancel the read delay of the read-only node, thereby improving system performance. It should be understood that when the master storage node constructs a data page of a version based on the redo log, if the redo log carrying the first identifier (for example, the end type) is found, the redo log may be directly ignored, that is, data is not processed. A reason is as follows: The redo log carrying the first identifier is merely used to indicate that a transaction ends, and does not have an additional meaning; in other words, the redo log of this type does not request to modify data.

In one embodiment, the determining, by the master storage node, the first data based on the information about the first transaction, and executing the first transaction includes: parsing, by the master storage node, the at least one log; and replicating, by the master storage node, the at least one log to at least one slave storage node according to a replication protocol.

In one embodiment, the master storage node may parse the at least one log included in the first transaction, and when there are slave storage nodes, the master storage node may store the redo log into the log buffer pool 141, and store the at least one log (for example, the redo log) into log repositories 145 of most slave storage nodes according to the replication protocol (for example, a quorum replication protocol).

In one embodiment, the replicating, by the master storage node, the at least one log to at least one slave storage node according to a replication protocol includes:

replicating, by the master storage node, the at least one log to the at least one slave storage node according to the replication protocol when the master storage node parses the at least one log.

In one embodiment, the master storage node may concurrently parse and replicate the at least one log. In other words, the master storage node replicates the at least one log to the at least one slave storage node according to the replication protocol when parsing the at least one log.

In this embodiment, the at least one log is replicated between different storage nodes and the master storage node parses the at least one log at the same time, thereby increasing a speed of generating the first transaction status metadata, preventing a slow update of transaction status information from affecting a speed of committing the first transaction, and increasing a request throughput rate of the read-write node.

In one embodiment, after the generating, by the master storage node, first transaction status metadata based on a current status of the first data, the method further includes:

sending, by the master storage node, the first transaction status metadata to the read-write node.

In one embodiment, after generating the first transaction status metadata, the master storage node may further send the first transaction status metadata to the read-write node. That is, in the database system 100, the read-write node 120 further includes global transaction status metadata 123, configured to store transaction status metadata. The transaction status metadata may be generated by the read-write node, or may be sent by the master storage node to the read-write node. This is not limited in this embodiment of this application.

It should be understood that an advantage of disposing, on the read-write node, the module storing the global transaction status metadata is as follows: The read-write node is generally specified by an external manager or administrator, and each read-only node has clear management configuration information about a node from which transaction status metadata information on the read-write node can be obtained. However, because data is backed up between storage nodes according to a consistency replication protocol, roles of the master storage node and the slave storage node may change during running, that is, a master storage node becomes a slave storage node, and a slave storage node becomes a master storage node. If the module storing the global transaction status metadata is located on the master storage node, the read-only node needs an extra mechanism to identify which storage node is a master storage node, to obtain transaction status metadata information. Therefore, the method in this embodiment of this application facilitates management, and system flexibility can be improved.

Figure 6:
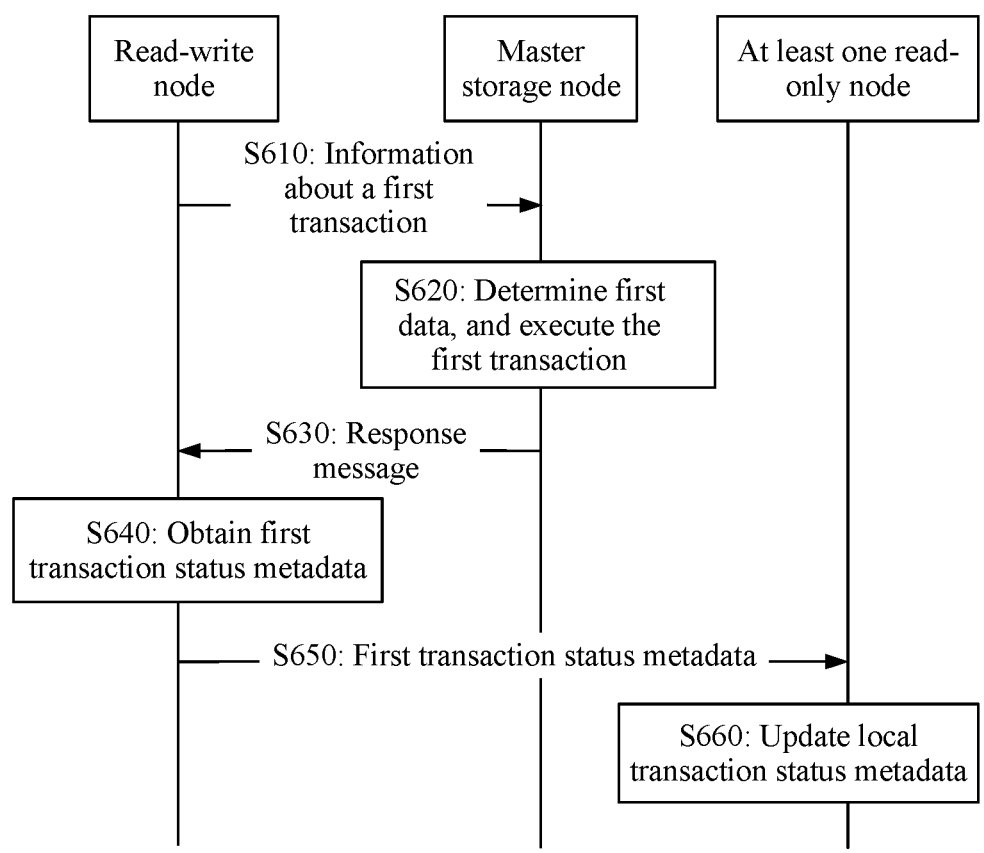
FIG. 6 is a schematic flowchart of another data processing method according to an embodiment.

FIG. 6 is a schematic flowchart of another data processing method according to an embodiment. Method 600 may be applied to the communications system 100 shown in FIG. 1, but this embodiment of this application is not limited thereto.

S610: A read-write node sends information about a first transaction to a master storage node, where the information about the first transaction is used to request to perform a write operation on first data stored on the master storage node, and the information about the first transaction may include at least one log.

Correspondingly, the master storage node receives the information that is about the first transaction and that is sent by the read-write node.

S620: The master storage node determines the first data based on the information about the first transaction, and executes the first transaction.

S630: The master storage node sends a response message to the read-write node, where the response message is used to indicate a result of executing the first transaction.

Correspondingly, the read-write node receives the response message sent by the master storage node.

S640: The read-write node obtains first transaction status metadata, where the first transaction status metadata includes identification information of expired data and identification information of the first transaction.

S650: The read-write node sends the first transaction status metadata to at least one read-only node when the read-write node receives the response message.

Correspondingly, the at least one read-only node receives the first transaction status metadata sent by the read-write node.

S660: The at least one read-only node updates local transaction status metadata based on the first transaction status metadata.

In one embodiment, the read-write node may send the information about the first transaction to the master storage node, to request to perform the write operation on the first data. The information about the first transaction may include at least one log, and the following uses a redo log as an example for description. Content of the redo log may include a type of an operation, content of the operation, a log sequence number LSN, and the like. In one embodiment, the read-write node may temporarily store the redo log in a log record 122, send, to the master storage node through network communication (for example, RPC), a redo log on which a database needs to perform a read/write operation, and wait for a response from the storage node. After receiving the information about the first transaction, the master storage node may parse the redo log included in the information, and match the redo log with a corresponding data page, that is, determine the first data. In one embodiment, the master storage node may store the redo log into a log buffer pool 141, parse the redo log by using a quick log parser 143, and match the redo log with a corresponding data page.

It should be understood that, that a transaction ends means that the transaction is committed, interrupted, or rolled back. That the transaction is committed means that the transaction is successfully executed. That the transaction is rolled back means that the transaction is restored to a status of the transaction before the transaction is executed. That the transaction is interrupted means that execution of the transaction is stopped. The read-write node may determine whether the first transaction ends, and obtain the first transaction status metadata that includes the identification information of the expired data and the identification information of the first transaction when the first transaction ends. The identification information of the expired data and the identification information of the first transaction may be an identifier ID of an expired page and an identifier ID of the first transaction. However, this is not limited in this embodiment of this application.

In one embodiment, the first transaction status metadata may include information such as a list of data pages that should expire in a buffer, a list of committed transactions, and an LSN visible under a currently executed transaction after modification is made through a redo log operation. In one embodiment, the read-write node includes global transaction status metadata 123, configured to store transaction status metadata. The transaction status metadata may be generated by the read-write node, or may be sent by the master storage node to the read-write node. This is not limited in this embodiment of this application.

After performing the write operation, the master storage node sends the response message to the read-write node, to indicate the result of executing the first transaction. When receiving the response message, the read-write node sends the first transaction status metadata to the at least one read-only node, so that the at least one read-only node updates the local transaction status metadata based on the first transaction status metadata. In one embodiment, the read-write node may delete a corresponding redo log from the log record 122 after receiving the response message and learning the result of executing the first transaction.

According to the data processing method in this embodiment of this application, the read-write node actively pushes transaction status metadata to the read-only node when receiving a response of a result of executing a transaction, so that the read-only node can obtain a latest transaction status, to ensure that content of a data page on the read-write node is consistent with content of a data page obtained through a read-only operation of the read-only node, and cancel a read delay of the read-only node, thereby improving user experience.

In one embodiment, before the sending, by the read-write node, the first transaction status metadata to at least one read-only node, the method further includes:

receiving, by the read-write node, the first transaction status metadata sent by the master storage node; or generating, by the read-write node, the first transaction status metadata when the first transaction ends.

In one embodiment, the first transaction status metadata may be determined by the read-write node, or may be generated by the master storage node and sent by the master storage node to the read-write node. This is not limited in this embodiment of this application.

In one embodiment, the information about the first transaction includes at least one log, a first log in the at least one log carries a first identifier, the first identifier is used to identify that the first transaction ends, and a log sequence number of the first log is a largest value in a log sequence number of the at least one log.

In one embodiment, the at least one log includes the first log, the first log carries the first identifier, and the first identifier is also referred to as an end identifier, and is used to identify that the first transaction ends. In one embodiment, a redo log of an end type may be added to identify that a transaction ends. However, this is not limited in this embodiment of this application.

It should be understood that the first transaction includes at least one log, each log includes a log sequence number, the master storage node sequentially executes the log of the first transaction based on the log sequence number, and the end identifier is carried to enable the master storage node to quickly identify that a transaction ends. For example, the first transaction may include three logs, and the three logs are respectively a log of an a=1 type, a log of a b=1 type, and a log of an end type according to an execution sequence; the master storage node sequentially executes the logs of the a=1 type, the b=1 type, and the end type, and when the log of the end type is found, the master storage node learns that the first transaction ends, and does not need to continue to process the first transaction.

Because the master storage node performs processing according to an LSN sequence, a log indicating that a transaction ends definitely has a largest LSN. When the log indicating that the transaction ends is executed, other logs definitely have been committed.

In this embodiment, ending of the transaction may be quickly identified by using the first identifier, to trigger generation of transaction status metadata, and further cancel the read delay of the read-only node, thereby improving system performance. It should be understood that when the master storage node constructs a data page of a version based on the redo log, if the redo log carrying the first identifier (for example, the end type) is found, the redo log may be directly ignored, that is, data is not processed. A reason is as follows: The redo log carrying the first identifier is merely used to indicate that a transaction ends, and does not have an additional meaning; in other words, the redo log of this type does not request to modify data.

In the method 500 and the method 600, the read-only node obtains the transaction status metadata in a pushing manner. The following describes a method 700 for obtaining, by a read-only node, transaction status metadata in a pulling manner. In the several embodiments, information about a committed transaction can be learned from the read-only node in time. When a read-only transaction is executed on the read-only node, the read-only node can obtain a latest visible LSN of a current system, and obtain a corresponding data page based on the LSN. Therefore, in this application, a problem that a data page read by the read-only node is inconsistent with content of a data page on the read-write node because transaction status metadata information on the read-only node lags behind transaction status metadata on a read-write node, that is, a read delay, can be resolved.

Figure 7:
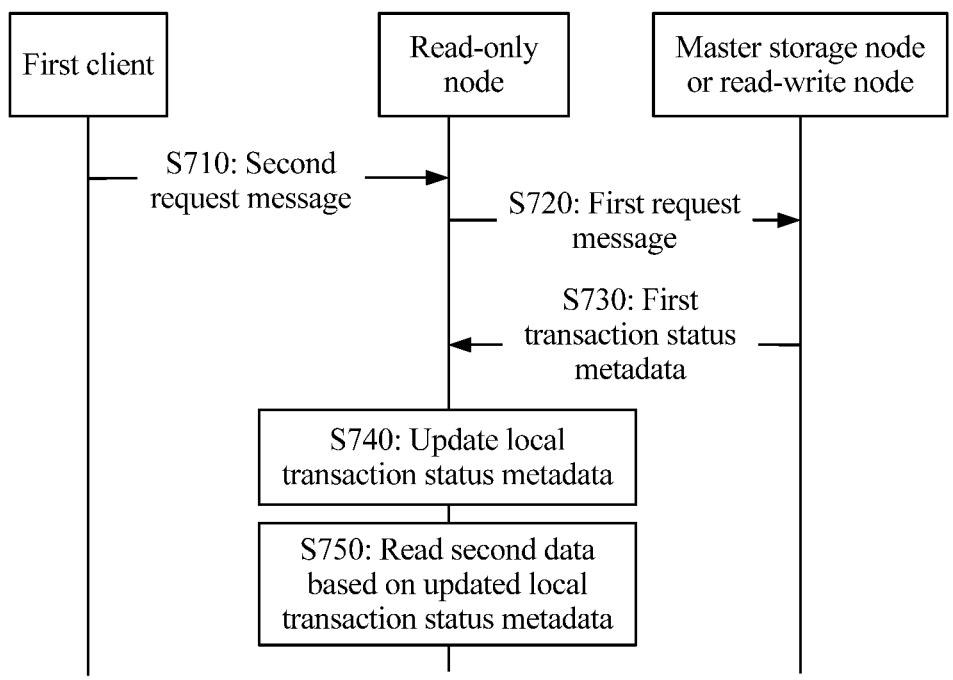
FIG. 7 is a schematic flowchart of another data processing method according to an embodiment.

FIG. 7 is a schematic flowchart of another data processing method according to an embodiment. Method 700 may be applied to the communications system 100 shown in FIG. 1, but this embodiment of this application is not limited thereto. It should be understood that a read-only node in the method 700 is any one of the foregoing at least one read-only node.

S710: A first client sends a second request message to the read-only node, where the second request message is used to request to perform a read-only operation on second data stored on at least one storage node, and the at least one storage node includes a master storage node.

Correspondingly, the read-only node receives the second request message sent by the first client.

S720: The read-only node sends a first request message to the master storage node or a read-write node based on the second request message, where the first request message is used to request to update local transaction status metadata, and the local transaction status metadata includes identification information of expired data and identification information of a committed transaction.

Correspondingly, the master storage node or the read-write node receives the first request message sent by the read-only node.

S730: The master storage node or the read-write node sends first transaction status metadata to the read-only node based on the first request message.

Correspondingly, the read-only node receives the first transaction status metadata sent by the master storage node or the read-write node.

S740: The read-only node updates the local transaction status metadata based on the first transaction status metadata.

S750: The read-only node reads the second data from the at least one storage node based on updated local transaction status metadata.

In one embodiment, the first client may send the second request message to the read-only node, to request to perform the read-only operation on the second data; and the read-only node receives the second request message, and sends the first request message to the master storage node or the read-write node, to request to update the local transaction status metadata. It should be understood that if a module storing global transaction status metadata is located on the master storage node, the read-only node may send the first request message to the master storage node; or if a module storing global transaction status metadata is located on the read-write node, the read-only node may send the first request message to the read-write node. This is not limited in this embodiment of this application.

After receiving the first request message sent by the read-only node, the master storage node or the read-write node sends newly generated transaction status metadata to the read-only node. It should be understood that the newly generated transaction status metadata may be metadata generated by the master storage node or the read-write node within a time interval between two request messages of the read-only node. Assuming that the master storage node or the read-write node generates only the first transaction status metadata within the time interval between previous receiving of a request from the read-only node and current receiving of a request from the read-only node, the master storage node or the read-write node may send the first transaction status metadata to the read-only node. The read-only node updates the local transaction status metadata based on the received transaction status metadata, to perform the read-only operation on the at least one storage node based on the updated local transaction status metadata.

In one embodiment, the updating process may be performed by a metadata update module 133 of the read-only node, and the local transaction status metadata of the read-only node is stored in a memory area corresponding to transaction status metadata 132. It should be understood that the storage node may include the master storage node and at least one slave storage node, but only the master storage node can generate and store transaction status metadata.

According to the data processing method in this embodiment, before performing a read-only operation, the read-only node sends an update request to the master storage node or the read-write node that stores transaction status metadata, and the master storage node or the read-write node sends latest transaction status metadata to the read-only node only after receiving the update request, so that the read-only node can obtain a latest transaction status before performing the read-only operation, to ensure that content of a data page on the read-write node is consistent with content of a data page obtained through a read-only operation of the read-only node, and cancel a read delay of the read-only node, thereby improving user experience.

In one embodiment, the reading, by the read-only node, the second data from the at least one storage node based on updated local transaction status metadata includes:

determining, by the read-only node, a second identifier based on the updated local transaction status metadata, where the second identifier corresponds to a latest version of the second data;

sending, by the read-only node, a third request message to the at least one storage node, where the third request message is used to request to read the second data corresponding to the second identifier; and receiving, by the read-only node, the second data that corresponds to the second identifier and that is sent by the at least one storage node.

In one embodiment, the read-only node may obtain, based on the updated local transaction status metadata, the second identifier corresponding to the latest version of the second data, to read the second data of the latest version from the at least one storage node.

In one embodiment, the read-only node may obtain a current visible LSN based on the identification information of the expired data and the identification information of the committed transaction, where the current visible LSN is a largest value in a log sequence number included in the committed transaction, for example, lsn1, and send, to a storage node based on the lsn1, a request of reading a data page of a corresponding version, where the request includes information such as a number of the data page and a version number. After receiving the request, the storage node constructs a data page whose version number is lsn1. The storage node may redo a log based on a log sequence number of a committed transaction until a log having the largest value lsn1 in the log sequence number included in the committed transaction is executed, and return a latest data page of the lsn1 to the read-only node through a network.

The read-only node stores the returned data page into a page buffer pool 131, and successfully reads the data page of the corresponding version.

In one embodiment, before the sending, by the read-only node, a first request message to the master storage node or a read-write node based on the second request message, the method further includes:

buffering, by the read-only node, the second request message, and starting a timer; and receiving, by the read-only node, at least one fourth request message sent by a second client, where the at least one fourth request message is used to request to perform a read-only operation on third data stored on the at least one storage node; and the sending, by the read-only node, a first request message to the master storage node or a read-write node based on the second request message includes:

sending, by the read-only node, the first request message to the master storage node or the read-write node when a quantity of messages buffered on the read-only node exceeds a first threshold, or the timer expires.

In one embodiment, the read-only node may block a request of initiating updating of transaction status metadata, and initiate requests in batches after a received request message meets a specific condition. After receiving the second request message sent by the first client, the read-only node may buffer the second request message and start the timer. Subsequently, the read-only node may receive another request message that is sent by another client and that is used to request to perform a read-only operation on other data, for example, the at least one fourth request message that is sent by the second client and that is used to request to perform the read-only operation on the third data. The read-only node may determine, in real time, whether a quantity of messages in a buffer queue exceeds the first threshold, or whether the timer expires. If the quantity of messages in the buffer queue exceeds the first threshold, or the timer expires, the read-only node sends the first request message to the master storage node or the read-write node, to request to update the local transaction status metadata.

In this embodiment, the read-only node blocks a single read-only transaction within a specific time, and obtains transaction status metadata from the storage node in batches for a plurality of read-only transactions, thereby preventing transaction status metadata on the storage node from being separately obtained for each read-only transaction, avoiding a high network load caused because transaction status metadata is obtained once for each read-only transaction, and increasing a throughput rate of obtaining transaction status metadata.

It should be understood that sequence numbers of the processes do not represent an execution sequence. The execution sequence of the processes should be determined based on the functions and internal logic of the processes. The sequence numbers should not constitute any limitation to the implementation processes of the embodiments of this application.

The foregoing has described in detail the data processing method in the embodiments of this application with reference to FIG. 1 to FIG. 7. The following describes in detail a data processing apparatus in the embodiments of this application with reference to FIG. 8 to FIG. 13.

Figure 8:
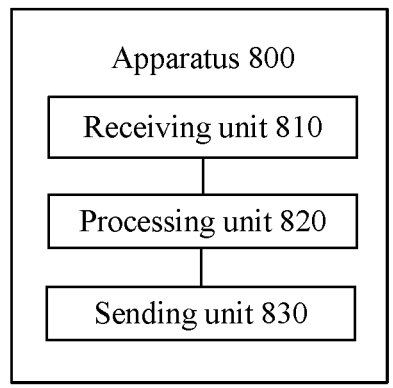
FIG. 8 is a schematic block diagram of a data processing apparatus according to an embodiment.

FIG. 8 shows a data processing apparatus according to an embodiment of this application. Apparatus 800 includes:

a receiving unit 810, configured to receive information that is about a first transaction and that is sent by a read-write node, where the information about the first transaction is used to request to perform a write operation on first data stored on the apparatus;

a processing unit 820, configured to: determine the first data based on the information about the first transaction, and execute the first transaction, where the processing unit 820 is further configured to:

generate first transaction status metadata when the first transaction ends, where the first transaction status metadata includes identification information of expired data and identification information of the first transaction; and a sending unit 830, configured to send the first transaction status metadata to at least one read-only node.

According to the data processing apparatus in this embodiment, the master storage node actively pushes transaction status metadata to the read-only node when a transaction ends, so that the read-only node can obtain a latest transaction status, to ensure that content of a data page on the read-write node is consistent with content of a data page obtained through a read-only operation of the read-only node, and cancel a read delay of the read-only node, thereby improving user experience.

In one embodiment, the sending unit 830 is further configured to send a response message to the read-write node after the first transaction status metadata is generated based on a current status of the first data, where the response message is used to indicate a result of executing the first transaction.

In one embodiment, the information about the first transaction includes at least one log, a first log in the at least one log carries a first identifier, the first identifier is used to identify that the first transaction ends, and a log sequence number of the first log is a largest value in a log sequence number of the at least one log.

In one embodiment, the processing unit is configured to: parse the at least one log, and replicate the at least one log to at least one slave storage node according to a replication protocol.

In one embodiment, the processing unit is configured to replicate the at least one log to at least one slave storage node according to a replication protocol when parsing the at least one log.

In one embodiment, the sending unit 830 is further configured to send the first transaction status metadata to the read-write node after the first transaction status metadata is generated based on the current status of the first data.

It should be understood that the apparatus 800 herein is reflected in a form of a functional unit. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another appropriate component supporting the described functions. A person skilled in the art may understand that the apparatus 800 may be the master storage node in the foregoing embodiments, and the apparatus 800 may be configured to perform procedures and/or steps corresponding to the master storage node in the foregoing method embodiments. To avoid repetition, details are not described herein again.

Figure 9:
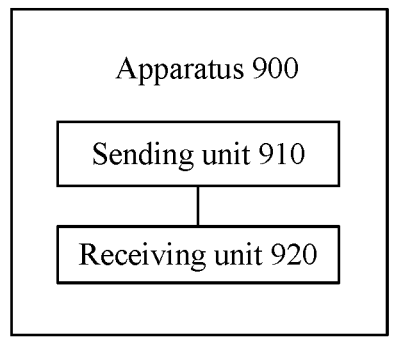
FIG. 9 is a schematic block diagram of another data processing apparatus according to an embodiment.

FIG. 9 shows another data processing apparatus according to an embodiment. Apparatus 900 includes:

a sending unit 910, configured to send information about a first transaction to a master storage node, where the information about the first transaction is used to request to perform a write operation on first data stored on the master storage node, and the information about the first transaction includes at least one log; and a receiving unit 920, configured to receive a response message sent by the master storage node, where the response message is used to indicate a result of executing the first transaction, where the sending unit 910 is further configured to:

send first transaction status metadata to at least one read-only node when the response message is received, where the first transaction status metadata includes identification information of expired data and identification information of the first transaction.

According to the data processing apparatus in this embodiment, the read-write node actively pushes transaction status metadata to the read-only node when receiving a response of a result of executing a transaction, so that the read-only node can obtain a latest transaction status, to ensure that content of a data page on the read-write node is consistent with content of a data page obtained through a read-only operation of the read-only node, and cancel a read delay of the read-only node, thereby improving user experience.

In one embodiment, the receiving unit 920 is further configured to: before the first transaction status metadata is sent to the at least one read-only node, receive the first transaction status metadata sent by the master storage node; or the apparatus further includes: a processing unit, configured to generate the first transaction status metadata when the first transaction ends.

In one embodiment, the information about the first transaction includes at least one log, a first log in the at least one log carries a first identifier, the first identifier is used to identify that the first transaction ends, and a log sequence number of the first log is a largest value in a log sequence number of the at least one log.

It should be understood that the apparatus 900 herein is reflected in a form of a functional unit. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another appropriate component supporting the described functions. A person skilled in the art may understand that the apparatus 900 may be the read-write node in the foregoing embodiments, and the apparatus 900 may be configured to perform procedures and/or steps corresponding to the read-write node in the foregoing method embodiments. To avoid repetition, details are not described herein again.

Figure 10:
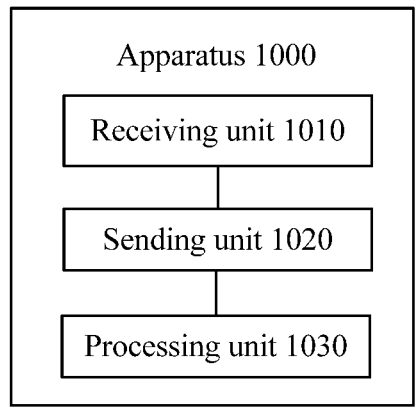
FIG. 10 is a schematic block diagram of another data processing apparatus according to an embodiment.

FIG. 10 shows another data processing apparatus according to an embodiment. Apparatus 1000 includes:

a receiving unit 1010, configured to receive a second request message sent by a first client, where the second request message is used to request to perform a read-only operation on second data stored on at least one storage node, and the at least one storage node includes a master storage node;

a sending unit 1020, configured to send a first request message to the master storage node or a read-write node based on the second request message, where the first request message is used to request to update local transaction status metadata, and the local transaction status metadata includes identification information of expired data and identification information of a committed transaction, where the receiving unit 1010 is further configured to:

receive first transaction status metadata that is sent by the master storage node or the read-write node based on the first request message; and a processing unit 1030, configured to update the local transaction status metadata based on the first transaction status metadata, where the processing unit 1030 is further configured to read the second data from the at least one storage node based on updated local transaction status metadata.

According to the data processing apparatus in this embodiment, before performing a read-only operation, a read-only node sends an update request to the master storage node or the read-write node that stores transaction status metadata, and the master storage node or the read-write node sends latest transaction status metadata to the read-only node only after receiving the update request, so that the read-only node can obtain a latest transaction status before performing the read-only operation, to ensure that content of a data page on the read-write node is consistent with content of a data page obtained through a read-only operation of the read-only node, and cancel a read delay of the read-only node, thereby improving user experience.

In one embodiment, the processing unit 1030 is further configured to determine a second identifier based on the updated local transaction status metadata, where the second identifier corresponds to a latest version of the second data; the sending unit 1020 is further configured to send a third request message to the at least one storage node, where the third request message is used to request to read the second data corresponding to the second identifier; and the receiving unit 1010 is further configured to receive the second data that corresponds to the second identifier and that is sent by the at least one storage node.

In one embodiment, the processing unit 1030 is further configured to: before the first request message is sent to the master storage node or the read-write node based on the second request message, buffer the second request message and start a timer; the receiving unit 1010 is further configured to receive at least one fourth request message sent by a second client, where the at least one fourth request message is used to request to perform a read-only operation on third data stored on the at least one storage node; and the sending unit 1020 is configured to send the first request message to the master storage node or the read-write node when a quantity of messages buffered in the apparatus exceeds a first threshold, or the timer expires.

It should be understood that the apparatus 1000 herein is reflected in a form of a functional unit. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another appropriate component supporting the described functions. A person skilled in the art may understand that the apparatus 1000 may be the read-only node in the foregoing embodiments, and the apparatus 1000 may be configured to perform procedures and/or steps corresponding to the read-only node in the foregoing method embodiments. To avoid repetition, details are not described herein again.

Figure 11:
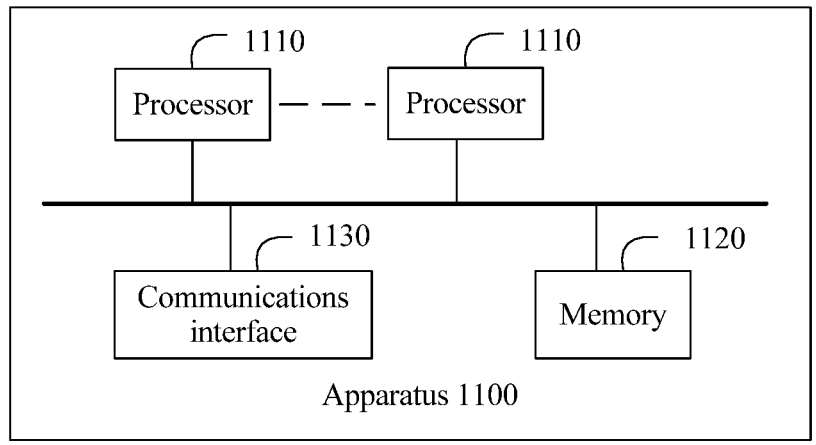
FIG. 11 is a schematic block diagram of another data processing apparatus according to an embodiment.

FIG. 11 shows another data processing apparatus according to an embodiment of this application. Apparatus 1100 includes at least one processor 1110, a memory 1120, and a communications interface 1130. The at least one processor 1110, the memory 1120, and the communications interface 1130 are connected through an internal path.

The memory 1120 is configured to store a computer executable instruction.

The at least one processor 1110 is configured to execute the computer executable instruction stored in the memory 1120, so that the apparatus 1100 can exchange data with another apparatus through the communications interface 1130, to perform the data processing method provided in the method embodiment 500.

The at least one processor 1110 is configured to perform the following operations:

receiving information that is about a first transaction and that is sent by a read-write node, where the information about the first transaction is used to request to perform a write operation on first data stored on the apparatus;

determining the first data based on the information about the first transaction, and executing the first transaction;

generating first transaction status metadata based on a current status of the first data when the first transaction ends, where the first transaction status metadata includes identification information of expired data and identification information of the first transaction; and sending the first transaction status metadata to at least one read-only node.

According to the data processing apparatus in this embodiment, the apparatus actively pushes transaction status metadata to the read-only node when a transaction ends, so that the read-only node can obtain a latest transaction status, to ensure that content of a data page on the read-write node is consistent with content of a data page obtained through a read-only operation of the read-only node, and cancel a read delay of the read-only node, thereby improving user experience.

It should be understood that the apparatus 1100 may be the master storage node in the foregoing embodiments, and may be configured to perform steps and/or procedures corresponding to the master storage node in the method embodiment 500.

Figure 12:
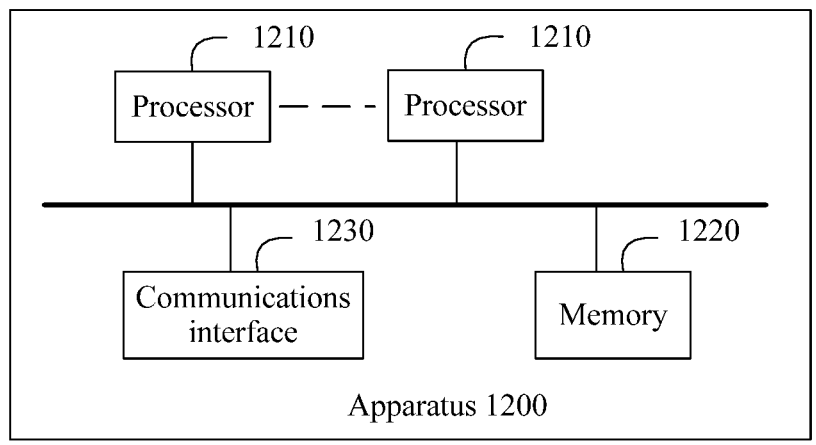
FIG. 12 is a schematic block diagram of another data processing apparatus according to an embodiment.

FIG. 12 shows another data processing apparatus according to an embodiment. Apparatus 1200 includes at least one processor 1210, a memory 1220, and a communications interface 1230. The at least one processor 1210, the memory 1220, and the communications interface 1230 are connected through an internal path.

The memory 1220 is configured to store a computer executable instruction.

The at least one processor 1210 is configured to execute the computer executable instruction stored in the memory 1220, so that the apparatus 1200 can exchange data with another apparatus through the communications interface 1230, to perform the data processing method provided in the method embodiment 600.

The at least one processor 1210 is configured to perform the following operations:

sending information about a first transaction to a master storage node, where the information about the first transaction is used to request to perform a write operation on first data stored on the master storage node, and the information about the first transaction includes at least one log;

receiving a response message sent by the master storage node, where the response message is used to indicate a result of executing the first transaction; and sending first transaction status metadata to at least one read-only node when the response message is received, where the first transaction status metadata includes identification information of expired data and identification information of the first transaction.

According to the data processing apparatus in this embodiment, the read-write node actively pushes transaction status metadata to the read-only node when receiving a response of a result of executing a transaction, so that the read-only node can obtain a latest transaction status, to ensure that content of a data page on the read-write node is consistent with content of a data page obtained through a read-only operation of the read-only node, and cancel a read delay of the read-only node, thereby improving user experience.

It should be understood that the apparatus 1200 may be the read-write node in the foregoing embodiments, and may be configured to perform steps and/or procedures corresponding to the read-write node in the method embodiment 600.

Figure 13:
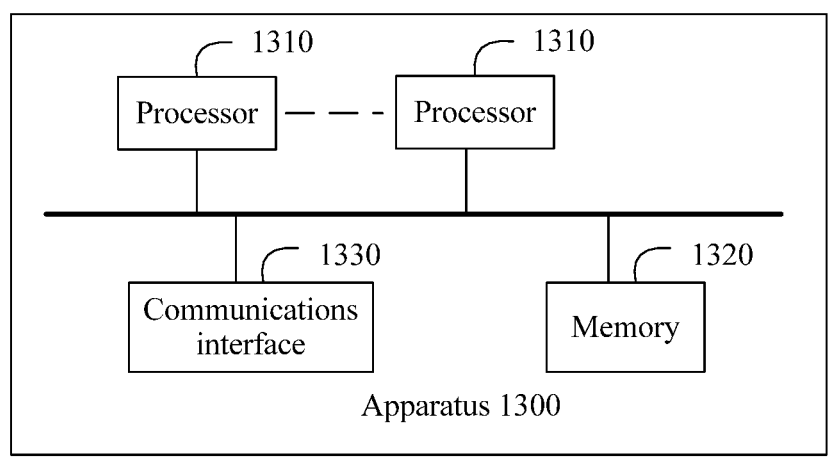
FIG. 13 is a schematic block diagram of another data processing apparatus according to an embodiment.

FIG. 13 shows another data processing apparatus 1300 according to an embodiment. Apparatus 1300 includes at least one processor 1310, a memory 1320, and a communications interface 1330. The at least one processor 1310, the memory 1320, and the communications interface 1330 are connected through an internal path.

The memory 1320 is configured to store a computer executable instruction.

The at least one processor 1310 is configured to execute the computer executable instruction stored in the memory 1320, so that the apparatus 1300 can exchange data with another apparatus through the communications interface 1330, to perform the data processing method provided in the method embodiment 700.

The at least one processor 1310 is configured to perform the following operations:

receiving a second request message sent by a first client, where the second request message is used to request to perform a read-only operation on second data stored on at least one storage node, and the at least one storage node includes a master storage node;

sending a first request message to the master storage node or a read-write node based on the second request message, where the first request message is used to request to update local transaction status metadata, and the local transaction status metadata includes identification information of expired data and identification information of a committed transaction;

receiving first transaction status metadata that is sent by the master storage node or the read-write node based on the first request message;

updating the local transaction status metadata based on the first transaction status metadata; and reading the second data from the at least one storage node based on updated local transaction status metadata.

According to the data processing apparatus in this embodiment, before performing a read-only operation, a read-only node sends an update request to the master storage node or the read-write node that stores transaction status metadata, and the master storage node or the read-write node sends latest transaction status metadata to the read-only node only after receiving the update request, so that the read-only node can obtain a latest transaction status before performing the read-only operation, to ensure that content of a data page on the read-write node is consistent with content of a data page obtained through a read-only operation of the read-only node, and cancel a read delay of the read-only node, thereby improving user experience.

It should be understood that the apparatus 1300 may be the read-only node in the foregoing embodiments, and may be configured to perform steps and/or procedures corresponding to the read-only node in the method embodiment 700.

It should be understood that in the embodiments of this application, at least one processor may include a central processing unit (CPU), or the processor may include another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory may be any one of or any combination of the following storage media: a random access memory (RAM), a read-only memory (ROM), a non-volatile memory (NVM), a solid state drive (SSD), a hard drive, a magnetic disk, a disk array, and the like.

The communications interface is configured for data exchange between the apparatus and another device. The communications interface may include any one of or any combination of the following components with a network access function: a network interface (for example, an Ethernet interface), a wireless network interface card, and the like.

In one embodiment, the at least one processor, the memory, and the communications interface may be connected by using a bus. The bus may include an address bus, a data bus, a control bus, or the like. The bus may include any one of or any combination of the following components configured for wired data transmission: an industry standard architecture (ISA) bus, a peripheral component interconnect (PCI) bus, an extended industry standard architecture (EISA) bus, and the like.

In some embodiments, steps in the foregoing methods can be implemented by using a hardware integrated logic circuit in the processor, or by using an instruction in a form of software. The steps of the methods disclosed with reference to the embodiments of this application may be directly performed by a hardware processor, or may be performed by using a combination of hardware in the processor and a software unit. The software unit may be located in a mature storage medium in the art, for example, a random access memory, a flash memory, a read-only memory, a programmable read-only memory, an electrically erasable programmable memory, or a register. The storage medium is located in the memory, and the processor executes an instruction in the memory to implement the steps in the foregoing methods in combination with hardware of the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that method steps and units described with reference to the embodiments disclosed in this specification may be implemented by electronic hardware, computer software, or a combination thereof. To clearly describe interchangeability between the hardware and the software, the foregoing has generally described steps and compositions of each embodiment based on functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces, and indirect couplings or communication connections between the apparatuses or units may be electrical connections, mechanical connections, or connections in other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method of data processing, comprising:
receiving, by a master storage node, information about a first transaction, wherein the information about the first transaction is sent by a read-write node and is used to request performance of a write operation on first data stored on the master storage node;
determining, by the master storage node, the first data based on the information about the first transaction, and executing the first transaction;
generating, by the master storage node, first transaction status metadata when the first transaction ends, wherein the first transaction status metadata comprises identification information of expired data and identification information of the first transaction; and
sending, by the master storage node, the first transaction status metadata to at least one read-only node;
wherein
the information about the first transaction comprises at least one log, wherein a first log in the at least one log carries a first identifier used to identify that the first transaction ends;
determining the first data based on the information about the first transaction comprises:
parsing, by the master storage node, the at least one log; and
replicating, by the master storage node, the at least one log to at least one slave storage node according to a replication protocol.

2. The method according to claim 1, further comprising:
after generating the first transaction status metadata when the first transaction ends,
sending, by the master storage node, a response message to the read-write node, wherein the response message is used to indicate a result of executing the first transaction.

3. The method according to claim 1, wherein a log sequence number of the first log is a largest value in a log sequence number of the at least one log.

4. The method according to claim 1, wherein replicating the at least one log to at least one slave storage node according to the replication protocol comprises:
replicating, by the master storage node, the at least one log to the at least one slave storage node according to the replication protocol when the master storage node parses the at least one log.

5. The method according to claim 1, further comprising:
after generating the first transaction status metadata when the first transaction ends,
sending, by the master storage node, the first transaction status metadata to the read-write node.

6. A data processing apparatus, comprising:
at least one processor, a memory storing computer executable instructions, which when executed by the at least one processor, cause the at least one processor to perform operations, the operations comprising:
receiving, by a master storage node, information about a first transaction, wherein the information about the first transaction is sent by a read-write node and is used to request performance of a write operation on first data stored on the master storage node;
determining, by the master storage node, the first data based on the information about the first transaction, and executing the first transaction;
generating, by the master storage node, first transaction status metadata when the first transaction ends, wherein the first transaction status metadata comprises identification information of expired data and identification information of the first transaction; and sending, by the master storage node, the first transaction status metadata to at least one read-only node;

wherein the information about the first transaction comprises at least one log, a first log in the at least one log carries a first identifier used to identify that the first transaction ends;

determining the first data based on the information about the first transaction comprises:

parsing, by the master storage node, the at least one log; and replicating, by the master storage node, the at least one log to at least one slave storage node according to a replication protocol.

7. The data processing apparatus of claim 6, further comprising: sending, by the master storage node, a response message to the read-write node, wherein the response message is used to indicate a result of executing the first transaction.

8. The data processing apparatus of claim 6, wherein a log sequence number of the first log is a largest value in a log sequence number of the at least one log.

9. The data processing apparatus of claim 6, wherein replicating the at least one log to at least one slave storage node according to the replication protocol comprises: replicating, by the master storage node, the at least one log to the at least one slave storage node according to the replication protocol when the master storage node parses the at least one log.

10. The data processing apparatus of claim 6, further comprising: sending, by the master storage node, the first transaction status metadata to the read-write node.

* * * * *